Oct. 28, 1952     C. F. MELLER     2,615,273
HOOK SETTER FOR FISHING TACKLE
Filed Sept. 7, 1951
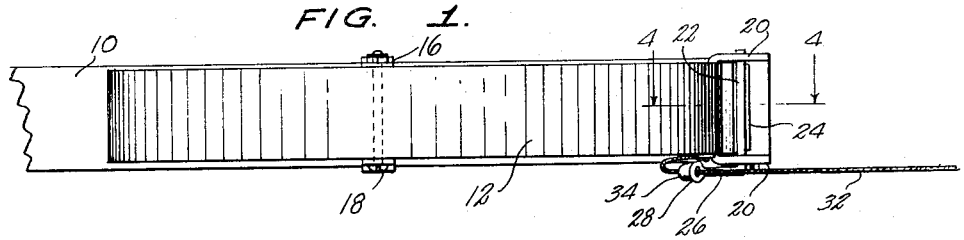
FIG. 1.
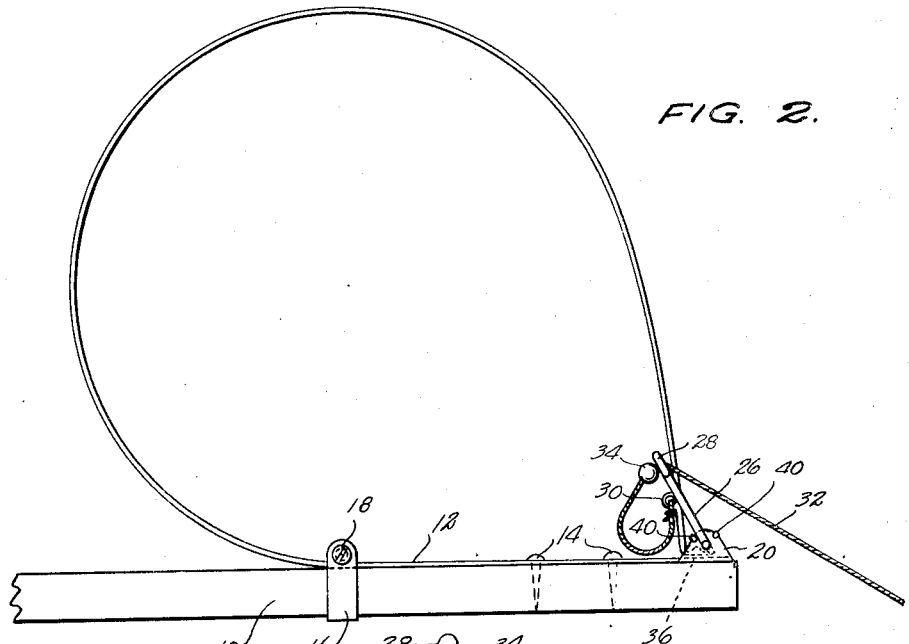
FIG. 2.
FIG. 4.
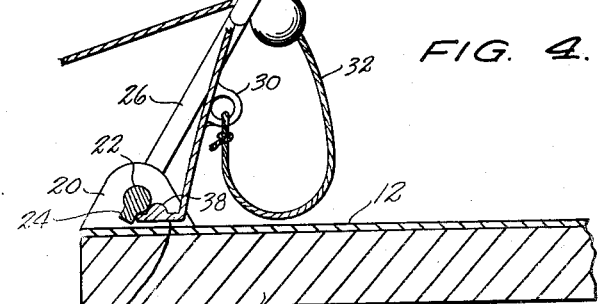
FIG. 3.
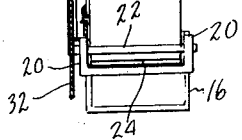
INVENTOR
CHRIS F. MELLER,
BY McMorrow, Berman & Davidson
ATTORNEYS Patented Oct. 28, 1952

2,615,273

UNITED STATES PATENT OFFICE 2,615,273

HOOK SETTER FOR FISHING TACKLE

Chris F. Meller, Booker, Tex.

Application September 7, 1951, Serial No. 245,500

4 Claims. (Cl. 43—15)

This invention relates to a device applicable to a fishing rod or to some other form of support, and adapted to be automatically triggered by a fish in a manner effective to set a hook in the fish's mouth automatically.

It is well appreciated among fishermen that many fish are lost by reason of the failure on the part of the fisherman to time properly the jerk given the line for the purpose of setting the hook in the fish's mouth.

It is, accordingly, an important object of the present invention to provide a device applicable to a fishing rod or similar support, and so formed as to set the hook automatically at the exact moment at which the fish takes the bait and pulls upon the line.

Another important object is to provide a device of the character stated which can be set in proper position for release by a fish with maximum speed and ease.

Yet another important object is to provide a hook-setting device that can be manufactured at relatively low cost, can be applied to or removed from a fishing rod or similar support with little difficulty, will be sure in operation, rugged, and composed of a minimum of parts simply arranged.

Other objects will appear from the following description, the claims appended thereto, and from the annexed drawing, in which like reference characters designate like parts throughout the several views, and wherein:

Figure 1 is a top plan view of a hook-setting device formed in accordance with the present invention, said device being illustrated in a set position, a support on which said device is mounted being illustrated fragmentarily;

Figure 2 is a side elevational view;

Figure 3 is an end elevational view of the device as viewed from the right of Figure 2; and Figure 4 is an enlarged fragmentary longitudinal sectional view taken on line 4—4 of Figure 1.

Referring to the drawings in detail, the reference numeral 10 designates a support member, here illustrated as a flat, elongated length of wood or similar material. However, it is to be understood that the term "support member" is also intended to refer to such supports as fishing rods or the like, and except as necessarily required by the scope of the appended claims, I do not desire to be restricted to any particular form of support upon which the device may be mounted.

The device includes an elongated, flat spring 12, one end of which is anchored fixedly to the support member 10 by means of screws 14 or equivalent fastening elements. Spaced longitudinally of the support member 10 from the fixedly anchored end of the spring 12 is a U-clamp 16 having arms embracing the support member and extended thereabove, the upwardly projecting portions of said arms being provided with a transversely disposed bolt 18 or the like that is spaced above the top surface of the support member, so as to permit the spring to extend between said bolt and the support member.

The U-clamp 16 is adjustable longitudinally of the spring and the associated support member 10, so as to vary the tension of the spring when the device is set for operation.

Upstanding from the opposite side edges of the fixedly anchored end of the spring 12 are ears 20, and journaled rotatably in and extending between said ears is a pin 22 integrally formed with a depending longitudinal rib 24.

The opposite ends of the pin 22 project beyond the ears 20, and integral or otherwise rigid with one of said projecting ends of the pin is an upwardly extended arm 26 having at its upper end an eye 28. It will be appreciated that when the arm 26 is swung, said swinging of the arm will be operative to rock the pin 22, so as to transmit swinging movement of the rib 24.

Spaced closely from the free end of the spring 12 is an eye 30 rigid with said spring at one side thereof, and secured at one end to the eye 30 is a line 32. A stop 34, which can comprise a bead or, in simpler forms of the invention, can be a knot in the line, is spaced closely from the end of the line that is secured to the spring 12, said stop 34 being adapted to engage the arm 26 to limit movement of the line 32 in one direction through the eye 28.

Formed upon the free end of the spring 12 is a laterally extended lip 36, between opposite ends of which is formed a rib 38 extending transversely of said spring.

Spaced stop lugs 40 are provided upon one of the ears 20 to limit swinging movement of the arm 26 in opposite directions.

In use, the lip 36 is extended into the space between the pin 22 and the anchored end of the spring 12, in the manner shown in Figure 4. The end edge of the lip 36, as may be readily seen from Figure 4, engages the rib 24 and rocks it to one position, said rocking of the rib being operative to rock the arm 26 in an opposite direction. Movement of the lip 36 through said space between the pin 22 and the anchored end of the spring 12 is limited by the rib 38, which engages the pin 22. Thus, the rib 38 constitutes means for predetermining the position of the spring and the pin 22 and rib 24 relative to one another, in the set position of the device.

It will be understood that the line 32 extends into the water and is provided with a hook, not shown, and suitable bait.

When a fish takes the bait, the nibbling of the bait by the fish will be operative to set up a pull upon the line 32, as a result of which the arm 26 will be swung toward the left in Figure 4 through the medium of the stop means 34 provided upon the line 32. As a result, the rib 24, tending to swing to the right in Figure 4, disengages the free end edge of the lip 36 from the pin 22, and this permits the spring 12, which is under strong tension, to expand. The free end of the spring, when the spring expands, swings upwardly at great speed, and jerks the line 32 upwardly, practically simultaneously with the nibbling of the bait by the fish.

As a result, the hook is set in the fish's mouth, and the fisherman is enabled to pull in the line for the purpose of landing the fish.

In the event the device is mounted upon a fishing rod, I have found that the most advantageous location is approximately two feet from the butt of the rod, the line 32 being extended through the several line guides of the rod in the usual manner. When the hook-setting device is mounted upon a fishing rod in this manner, the rod can be left unattended by the angler, and can, for example, be set into any suitable rod-holding means.

I believe that an important characteristic of the invention may now be readily noted. The device is so formed as to permit the placement of the parts in set position with maximum speed and minimum difficulty. It is necessary merely to insert the lip 36 in the space between the pin 22 and the anchored end of the spring 12, and this will automatically swing the arm 26 to the proper position, thus to relate the several parts of the device properly for operation. The device, in this connection, is highly sensitive to nibbling of the bait by the fish, and is set off automatically as soon as a sufficiently strong pull has been exerted upon the line, indicative of the taking of the bait by the fish.

Further, the device is rugged, and is very simple in construction. Thus, long life and low cost of manufacture are added as important characteristics of the invention.

Further, it may be noted that the construction is such as to permit the use of a tension-adjusting means 16, 18, which is readily shifted longitudinally of the spring 12 and the support member 10 on which the spring is mounted, so as to vary the tension of the spring as desired.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a hook-setting device of the type in which a line is jerked responsive to agitation thereof by a fish, the combination, with a support member and with a fishing line, of an elongated flat spring anchored at one end to said member and tensionable to form a spring loop in which the free end of the spring overlies said anchored end thereof, said line being connected to said free end; a lip extended laterally from the free end of the spring; a projection on said lip; brackets upstanding from said anchored end of the spring; a cross-pin journaled in said brackets transversely of the spring and spaced above the anchored end of the spring to provide a space in which said lip is insertable, the projection on the lip engaging the cross-pin to limit movement of the lip in one direction; a longitudinally extended radial rib on the cross-pin adapted to engage the free end of the spring on rotation of the cross-pin to one position, and to release said free end when the pin is rotated to another position; a trigger arm rigid at one end with the cross-pin for rotating the same and having an eye at its other end, said arm being swingable between extreme positions in one of which the cross-pin engages said free end to hold the spring tensioned and in the other of which the spring is released to jerk the line, the line being extended through the eye of the trigger arm; and means on the line engaging said trigger arm to swing the arm to said second-named position responsive to agitation of the line by a fish.

2. In a hook-setting device of the type in which a line is jerked responsive to agitation thereof by a fish, the combination, with a support member and with a fishing line, of an elongated flat spring anchored at one end to said member and tensionable to form a spring loop in which the free end of the spring overlies said anchored end thereof, said line being connected to said free end; a lip extended laterally from the free end of the spring; a projection on said lip; brackets upstanding from said anchored end of the spring; a cross-pin journaled in said brackets transversely of the spring and spaced above the anchored end of the spring to provide a space in which said lip is insertable, the projection on the lip engaging the cross-pin to limit movement of the lip in one direction; a longitudinally extended radial rib on the cross-pin adapted to engage the free end of the spring on rotation of the cross-pin to one position, and to release said free end when the pin is rotated to another position; a trigger arm rigid at one end with the cross-pin for rotating the same and having means spaced from said one end thereof adapted for extension therethrough of a line, said arm being swingable between extreme positions in one of which the cross-pin engages said free end to hold the spring tensioned and in the other of which the spring is released to jerk the line, the line being extended through said means of the trigger arm; and means on the line engaging said trigger arm to swing the arm to said second-named position responsive to agitation of the line by a fish.

3. In a hook-setting device of the type in which a line is jerked responsive to agitation thereof by a fish, the combination, with a support member and with a fishing line, of an elongated flat spring anchored at one end to said member and tensionable to form a spring loop in which the free end of the spring overlies said anchored end thereof, said line being connected to said free end; a lip integral with and extended laterally from the free end of the spring; a projection integrally formed upon said lip; brackets upstanding from and spaced transversely of said anchored end of the spring; a cross-pin journaled in and extending between said brackets transversely of the spring and spaced above the anchored end of the spring to provide a space in which said lip is insertable, the projection on the lip engaging the cross-pin to limit movement of the lip in one direction; a longitudinally extended radial rib on the cross-pin adapted to engage the free end of the spring on rotation of the cross-pin to one position, and to release said free end when the pin is rotated to another position; a trigger arm rigid at one end with and extending radially from the cross-pin for rotating the same and having an eye at its other end, said arm being swingable between extreme positions in one of which the cross-pin engages said free end to hold the spring tensioned and in the other of which the spring is released to jerk the line, the line being extended through the eye of the trigger arm; and means on the line engaging said trigger arm to swing the arm to said second-named position responsive to agitation of the line by a fish.

4. In a hook-setting device of the type in which a line is jerked responsive to agitation thereof by a fish, the combination, with a support member and with a fishing line, of an elongated flat spring anchored at one end to said member and tensionable to form a spring loop in which the free end of the spring overlies said anchored end thereof, said line being connected to said free end; a lip integral with and extended laterally from the free end of the spring in a direction away from the loop and having a free end edge spaced outwardly from the free end of the spring; a projection integrally formed upon the upper surface of said lip; brackets upstanding from and spaced transversely of the anchored end of the spring; a cross-pin journaled in said brackets transversely of the spring and spaced above the anchored end of the spring to provide a space in which said lip is insertable, the projection on the lip engaging the cross pin to limit movement of the lip in a direction away from the loop; a longitudinally extended, depending, radial rib on the cross-pin adapted to engage the free end edge of the rib on rotation of the cross-pin to one position, and to release said free end edge when the pin is rotated to another position; a trigger arm rigid at one end with and extending radially and upwardly from the cross-pin for rotating the same and having an eye at its upper end, said arm being swingable between extreme positions in one of which the cross-pin engages said free end edge of the lip to hold the spring tensioned and in the other of which the radial rib of the cross-pin exerts pressure against said free end edge tending to disengage the same from the cross-pin to release the spring and jerk the line, the line being extended through the eye of the trigger arm; and means on the line engaging said trigger arm to swing the arm to said second-named position thereof responsive to agitation of the line by a fish.

CHRIS F. MELLER.

REFERENCES CITED

The following references are of record in the file of this patent:

UNITED STATES PATENTS

| Number | Name | Date |
|---|---|---|
| 783,169 | Ball | Feb. 21, 1905 |
| 1,021,147 | Green | Mar. 26, 1912 |
| 1,996,704 | Hawkinson | Apr. 2, 1935 |